July 10, 1962 J. E. SCOTT 3,043,511

LOGICAL COMBINING CIRCUIT

Filed April 1, 1959

INVENTOR
JOHN E. SCOTT
BY Henry Huff
ATTORNEY

United States Patent Office 3,043,511
Patented July 10, 1962

3,043,511

LOGICAL COMBINING CIRCUIT

John E. Scott, Rego Park, N.Y., assignor to Sperry Rand, Corporation, Great Neck, N.Y., a corporation of Delaware Filed Apr. 1, 1959, Ser. No. 803,451
14 Claims. (Cl. 235—172)

This invention relates to multi-signal responsive circuits for producing dual-valued outputs and more particularly to circuits responsive to multi-level electrical quantities such as employed in Kirchoff adders.

In combining and switching circuits, especially for use in digital computers, it is most desirable and in many cases an economic or volumetric necessity that these circuits be simple, have a minimum number of compnents, and a minimum loading effect on the signal sources. These and other desirable attributes and advantages are characteristic of and may be enjoyed by the present invention which may take the form of a multi-level responsive switching system having first and second branches connected to a common input circuit subjected to multi-level electrical quantities, each branch having cascaded amplifiers and each amplifier having respective input, output and common electrodes, and for a particular condition the switching level of the first branch being modified in response to the output of a second branch amplifier fed to the common electrode of a first branch amplifier.

In accordance with one embodiment of the invention, a three-input Kirchoff binary adder includes respective transistorized sum and carry branches, and a biasing circuit including coupling from the collector electrode of a transistor in the carry branch to the emitter electrode of a transistor in the sum branch to modify the response threshold or switching level of the sum branch when binary 1's are present at any two input terminals in order to prevent the formation of a binary 1 in the output of the sum branch when binary 1's are present at only any two of the inputs.

The invention as contrasted with prior systems, results in a simpler system having less critical components and less loading of the input signal sources.

It is therefore an object of the present invention to provide a simplified multi-level response system for producing dual-valued signals at multiple outputs.

Another object of the invention is to provide a new and improved logical combining system.

Another object is to provide a new and improved Kirchoff adder.

Figure 2:
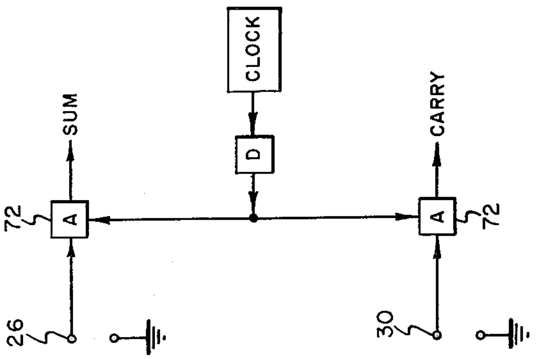
Figure 1:
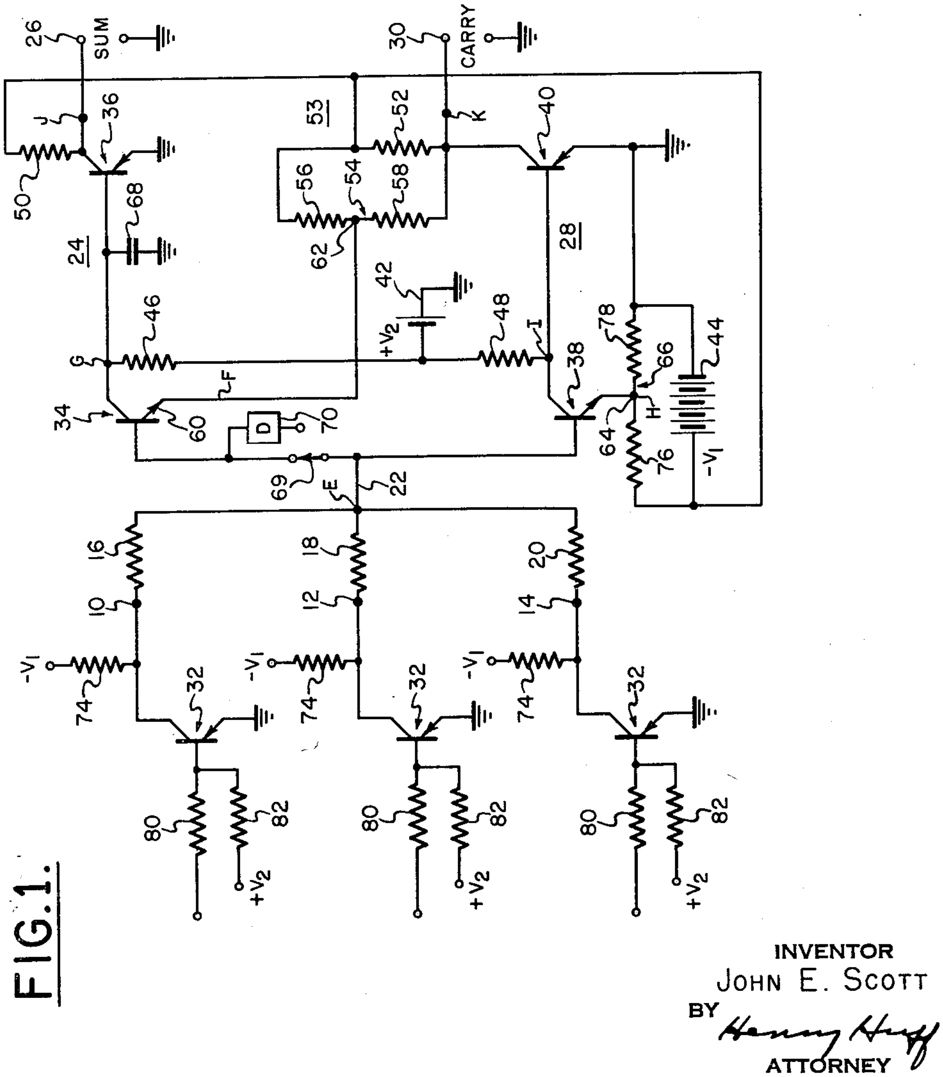

Further objects and advantages of the present invention will be apparent from the following description, reference being had to the accompanying drawing wherein FIG. 1 shows a preferred form of the present invention, and FIG. 2 illustrates a supplementary optional gating circuit.

A three-input binary adder produces suitable sum and carry outputs in response to three basic combinations of digits simultaneously present at the three input terminals which are generally for the reception of addend, augend and previous carry (carry from the addition of the previous order digits). When a binary 1 is present at any one only of the input terminals, the adder produces a 1 at the sum output terminal and a 0 at the carry output. In response to binary 1's at only any two of the input terminals, the adder produces a 0 at the sum output and a 1 at the carry output. In the third condition, when binary 1's are present at all of the inputs, binary 1's are produced at both the sum and carry outputs. One type of three-input Kirchoff adder for the first of the above conditions responds to an electrical quantity representing a binary 1; for the second condition, it responds to a quantity proportional to the sum of the electrical quantities representing binary 1's at two of the input terminals; and for the third condition, the adder responds to a quantity proportional to the sum of the electrical quantities representing binary 1's at all the input terminals.

Referring now to the drawing, the binary adder shown therein includes three input terminals 10, 12, and 14, coupled through respective resistors 16, 18, and 20 associated therewith to a common input line 22 coupled to two branches, a sum branch 24 which terminates in a sum output temrinal 26, and a carry branch 28 which terminates in a carry terminal 30. The input network including resistors 16, 18, and 20 provides at the common line 22 a voltage proportional to the sum of the voltages present at the three input terminals. In all electrical binary systems, dual electrical values are assigned to represent the binary digits. In the present disclosure, for illustrative purposes, binary 1 is represented by a negative potential, and binary 0 by a less negative or relatively positive potential. While the signals supplied to the input terminals 10, 12, and 14 of the adder may be from any suitable source, they are shown in the drawing as coming from the outputs of PNP transistors 32 whose input energization is not shown. The output terminals may be connected to drive components of logical circuits for example transistors.

The sum branch 24 includes cascaded transistors 34 and 36, and the carry branch 28 includes cascaded transistors 38 and 40. All the transistors are shown as being connected in common emitter configuration, and each is therefore an inverting amplifier. In the common emitter configuration, the emitter electrode of the transistor is common to both the input and output circuits of the transistor. The transistors in each branch are of opposite conductivity types, transistors 34 and 38 being indicated as NPN type while transistors 36 and 40 are shown as PNP type.

Emitter and collector voltages for the transistors are derived through various resistive networks from batteries 42 and 44. The positive end of battery 42 is connected to the collectors of transistors 34 and 38 through their respective collector resistors 46 and 48, while the negative pole of the battery is grounded. The collectors of transistors 36 and 40 are connected to the negative terminal of battery 44 through their respective collector resistors 50 and 52.

A bias network 53 including a voltage divider 54, formed by resistors 56 and 58 series-connected across the collector resistor 52, sets the voltage at the emitter 60 of transistor 34 by way of a connection from this emitter to a tap 62 of the voltage divider 54. Being across resistor 52, the voltage divider 54 responds to the states of transistor 40, and applies to the emitter 60 a negative voltage in response to the on or conductive state of transistor 40, and a more negative voltage in response to the off or non-conductive state of this transistor.

The emitter of transistor 38 is connected to a tap 64 of a voltage divider 66 connected across the battery 44, and the emitters of transistors 36 and 40 are grounded.

The voltages applied to the electrodes of the transistors are so arranged that transistors 36 and 40 are responsive to transistors 34 and 38, respectively. Transistor 36 is turned on (rendered conductive) and off (rendered nonconductive) in response to transistor 34 being turned on and off, respectively. Likewise, transistor 40 is turned on and off in response to transistor 38 being turned on and off, respectively.

Normally, with binary 0's present at all the input terminals 10, 12, and 14, the circuit constants are such that all the transistors of the sum and carry branches are "on," that is, conducting. For this condition, line 22, coupled to the base electrodes of transistors 34 and 38, is at a relatively positive potential with respect to the emitters of these transistors, thus forward biasing the emitter junctions of these transistors, forcing them to conduct and to produce at their respecitve collector electrodes and thereby to apply to the base electrodes of the PNP transistors 36 and 40 sufficiently negative potentials to forward bias the emitter junctions of transistors 36 and 40, thus holding them in conduction and producing at their respective collector electrodes and the associated output terminals 26 and 30 relatively positive potentials representative of binary 0's.

Transistor 38 is biased, by means of a circuit including the voltage divider 66, to have a normally more negative switching level than transistor 34, that is, transistor 38 requires a higher potential in a particular polarity direction (negative in example shown) on its base electrode to cut it off. More specifically, transistors 34 and 38 are normally so biased that the negative potential appearing on line 22 as a result of a binary 1 at only one input terminal is sufficiently negative to cut off transistor 34, but not negative enough to cut off transistor 38. Thus, transistor 38 may be said to normally have in a particular polarity direction a "higher" switching level (negative in this case) than transistor 34. The term "Higher in a particular polarity direction" is easiest defined or explained by examples such as the following arbitrary ones: —10 is higher than —5 in negative direction while —5 is higher than —10 in positive direction. Conversely —5 is lower than —10 in the negative polarity direction while —10 is lower than —5 in the positive polarity direction. With a binary 1 at only any one of the input terminals, transistor 34 is cut off thereby cutting off transistor 36 and producing a negative potential representative of a binary 1 at the sum output terminal 26. The negative potential on the input line 22 being insufficient to cut off transistor 38, transistor 40 remains conductive and no carry is generated.

When binary 1's appear at any two of the input terminals, the negative potential on input line 22 now being proportional to the sum of the potentials representing binary 1's at two terminals, it equals or exceeds in the negative direction the potential required to switch both transistors 34 and 38, thus cutting them off and consequently cutting off their following transistors 36 and 40, thereby producing negative potentials on the sum and carry output terminals 26 and 30, that at the carry terminal 30 being sufficient to be a binary 1. In the meantime, transistor 40, being cut off, causes the biasing circuit 53 connected between the collector electrode of transistor 40 and the emitter electrode 60 of transistor 34 to apply a sufficiently negative potential to the emitter of transistor 34 to render the transistor conductive, thereby rendering transistor 36 conductive. Thus, the negative output potential at the collector of transistor 36 will persist only for a time T, the interval beginning with the application of the cut off potential to the base electrode of transistor 36 and ending when transistor 36 is rendered conductive by the output of transistor 34 in response to the biasing of transistor 34 through the circuit 53 which responds to the cutting off of transistor 40. The time T can be made relatively short compared to the length of the information pulses at the adder inputs, and if the circuits following the adder have a response time longer than time T, it is unnecessary to eliminate the spurious pulse generated by the momentary non-conduction of transistors 34 and 36. In a successful practical example, the spurious pulse was about 1/6 the length and about 1/6 the amplitude of the information pulses. By connecting a capacitor 68 from the collector of transistor 34 to ground, the spurious pulse may be sufficiently "filtered out" to prevent any change in conduction of transistor 36 or at least to reduce its conduction only slightly so that a "true" or effective binary 1 is not produced at the sum output terminal 26. The occurrence of the spurious pulse may be prevented by introducing, by means of a switch 69, a delay 70 of time T in the lead between the line 22 and the base of transistor 34. This prevents the application of the signal from the line 22 to transistor 34 before the bias on the emitter 60 is changed by the cutting off of transistor 40. The spurious pulse may also be eliminated by gating the sum output circuit with clock pulses sufficiently delayed with respect to the information pulses supplied to the input line 22. Such gating may be provided at the outputs of both sum and carry branches for symmetry as shown in FIG. 2 which shows the output terminals 26 and 30 of FIG. 1 connected to AND gates 72 which are also fed by delayed clock pulses as shown. The clock pulse delay must be at least time T to eliminate the spurious pulses at the sum output.

While the negative bias supplied by the circuit 53 in response to the cutting off of transistor 40 is high enough (sufficiently negative) to render the transistor 34 conductive when its base electrode is subjected to the voltage proportional to the sum of the potentials representing binary 1's at two input terminals, it is not high enough to render the transistor 34 conductive when the potential on line 22 is proportional to the sum of the potentials representing binary 1's at all three of the input terminals. Thus, when binary 1's occur at all of the input terminals, all the transistors are cut off and binary 1's are produced at the sum and carry output terminals.

Following are some of the relationships in the particular circuit example shown: The output of each transistor is inverted with respect to the output of the other transistor in the branch. Thus, the output of the transistor 34 is inverted with respect to the input to the sum branch and perforce, the output of transistor 36 is non-inverted with respect to the input to the sum branch. The bias circuit 53, which inhibits a binary 1 at the sum output when binary 1's appear at only any two of the input terminals, being coupled between the collector electrode of transistor 40 and the emitter electrode of transistor 34 is thereby coupled at one end to a transistor whose output is inverted with respect to the input of its associated branch, while the other end of the bias circuit 53 is coupled to a transistor whose output is non-inverted with respect to the input of its associated branch.

In a practical example which operated satisfactorily, the following components and circuit constants were employed:

| | |
|---|---|
| Transistors 32, 36 and 40 | 2N240 (Philco). |
| Transistors 34 and 38 | 2N183 (CBS-Hytron). |
| Resistors 46 and 48 | 4700Ω. |
| Resistors 50 and 74 | 1600Ω. |
| Resistors 52 and 76 | 2200Ω. |
| Resistor 56 | 4300Ω. |
| Resistor 58 | 820Ω. |
| Resistor 78 | 1800Ω. |
| Resistors 16, 18, 20 and 80 | 2700Ω. |
| Resistor 82 | 3900Ω. |
| Battery 42 (+V) | 1.5 volts. |
| Battery 44 (—V) | 4.5 volts. |

If the capacitor 68 is employed, 100 $\mu\mu$f. would be a suitable value.

With the above components, the following voltages at the points indicated may be expected for the four conditions of operation:

| Binary Digits at Input Terminals 10, 12 and 14 | Voltages | | | | | | |
|---|---|---|---|---|---|---|---|
| | E | F | G | H | I | J | K |
| 000 | —1.1 | —.4 | —.3 | —.4 | —.3 | —.1 | —.1 |
| 001, 010, 100 | —1.1 | —.8 | +1.5 | —1.4 | —.3 | —2.8 | —.1 |
| 011, 101, 110 | —2.5 | —2.8 | —.3 | —2 | +1.5 | —.1 | —3.6 |
| 111 | —4.5 | —3.7 | +1.5 | —2 | +1.5 | —2.8 | —3.6 |

While the form of the embodiment of the invention as herein disclosed constitutes a preferred form, it is to be understood that other forms might be adopted, all coming within the scope of the claims which follow.

What is claimed is:

1. A binary adder comprising an input summing circuit including respective first and second input terminals and a common output terminal, respective sum and carry output terminals, a sum branch coupled between said common output terminal and the sum output terminal, a carry branch coupled between said common output terminal and the carry output terminal, each of said branches including an electron device, each device including respective input, output and common electrodes, a resistor connected in series with the output electrode of said carry branch device, the sum branch being responsive to a binary 1 at any of said input terminals to provide a 1 at the sum output terminal, the carry branch being responsive to binary 1's on both said input terminals to provide a 1 at the carry output terminal, and means for inhibiting a 1 at the sum output terminal when binary 1's are present at both the input terminals, said means including a bias circuit connected from the output electrode of said carry branch device to the common electrode of said sum branch device for modifying the response threshold of the sum branch device in response to the carry branch device, said bias circuit comprising a voltage divider connected across said resistor and having an intermediate tap connected to the common electrode of said sum branch device.

2. A binary adder comprising an input summing circuit including respective first, second and third input terminals and a common output terminal, respective sum and carry output terminals, a sum branch coupled between said common output terminal and the sum output terminal, a carry branch coupled between said common output terminal and the carry output terminal, each of said branches including an electron device, each device including respective input, output and common electrodes, a resistor connected in series with the output electrode of said carry branch device, the sum branch being responsive to a binary 1 at any of said input terminals to provide a 1 at the sum output terminal, the carry branch being responsive to binary 1's on at least two of said input terminals to provide a 1 at the carry output terminal, and means for inhibiting a 1 at the sum output terminal when binary 1's are present at any two of the input terminals, said means including a bias circuit connected from the output electrode of said carry branch device to the common electrode of said sum branch device for modifying the response threshold of the sum branch device in response to the carry branch device, said bias circuit comprising a voltage divider connected across said resistor and having an intermediate tap connected to the common electrode of said sum branch device, the sum branch being responsive to binary 1's present at all of the input terminals to overcome said inhibition thereby to provide a 1 at the sum output terminal.

3. A binary adder comprising an input circuit including respective first and second input terminals, respective sum and carry output terminals, a sum branch coupled between said input circuit and the sum output terminal, a carry branch coupled between said input circuit and the carry output terminal, each of said branches having a first and a second transistor each connected in grounded emitter configuration, each transistor including respective base, collector and emitter electrodes, the outputs of said first and second transistors in each branch being inverted with respect to each other, said first transistors being of one conductivity type and said second transistors being of the other conductivity type, said first transistor of each branch being coupled between said second transistor of the branch and said junction and its output being inverted with respect to the input of that branch, the sum branch being responsive to a binary 1 at any of said input terminals to provide a 1 at the sum output terminal, the carry branch being responsive to binary 1's on both input terminals to provide a 1 at the carry output terminal, means for inhibiting a 1 at the sum output terminal when binary 1's are present at both input terminals, said means including a bias circuit connected from the collector electrode of one of said transistors of the carry branch to the emitter electrode of one of said transistors of the sum branch for modifying the response threshold of the latter sum branch transistor in response to the latter carry branch transistor, said latter sum and carry transistors being of opposite conductivity types.

4. The combination of claim 3 wherein there is a resistor in series with the collector electrode of said second carry transistor, and said bias circuit includes a voltage divider connected across said resistor, the voltage divider having an intermediate tap connected to the emitter electrode of said first sum transistor.

5. A binary adder comprising an input circuit including respective first and second input terminals coupled to a common junction, respective sum and carry output terminals, a sum branch coupled between said junction and the sum output terminal, a carry branch coupled between said junction and the carry output terminal, each of said branches having a first and a second transistor each connected in grounded emitter configuration, each transistor including respective base, collector and emitter electrodes, the outputs of said first and second transistors in each branch being inverted with respect to each other, said first transistors being of one conductivity type and said second transistors being of the other conductivity type, said first transistor of each branch being coupled between said second transistors of the branch and said junction and its output being inverted with respect to the input of that branch, the sum branch being responsive to a binary 1 at any of said input terminals to provide a 1 at the sum output terminal, the carry branch being responsive to binary 1's on both input terminals to provide a 1 at the carry output terminal, means for inhibiting a 1 at the sum output terminal when binary 1's are present at both input terminals, said means including a bias circuit connected from the collector electrode of said second carry transistor to the emitter electrode of said first sum transistor for modifying the response threshold of the latter transistor in response to the second carry transistor.

6. The combination of claim 5 wherein there is a resistor in series with the collector electrode of said second carry transistor, and said bias circuit includes a voltage divider connected across said resistor, the voltage divider having an intermediate tap connected to the emitter electrode of said first sum transistor.

7. A binary adder comprising an input circuit including respective first, second and third input terminals connected to a common junction, respective sum and carry output terminals, a sum branch coupled between said common junction and the sum output terminal, a carry branch coupled between said common junction and the carry output terminal, each of said branches having a plurality of cascaded transistors connected in grounded emitter configuration and including a first and second transistor, each of said transistors having respective base, collector and emitter electrodes, the outputs of said first and second transistors in each stage branch being inverted with respect to each other, said first transistors being of one conductivity type and said second transistors being of the other conductivity type, said first transistors of each branch being coupled between said second transistors of the branch and said circuit junction and its output being inverted with respect to the input of the branch, the sum branch being responsive to a binary 1 at any one of said input terminals to provide a 1 at the sum output terminal, the carry branch being responsive to binary 1's on both said input terminals to provide a 1 at the carry output terminal, means for inhibiting a 1 at the sum output terminal when binary 1's are present at two of said input terminals, said means including a bias circuit connected from the collector electrode of said second carry transistor to the emitter electrode of said first sum transistor for modifying the response threshold of the first sum transistor in response to the second carry transistor, the sum branch being responsive to binary 1's present at all of the input terminals to overcome said inhibition thereby to provide a 1 at the sum output terminal.

8. The combination of claim 7 wherein there is a resistor in series with the collector electrode of said second carry transistor, and said bias circuit includes a voltage divider connected across said resistor, the voltage divider having an intermediate tap connected to the emitter electrode of said first sum transistor.

9. A binary adder comprising an input circuit including respective first and second input terminals, respective sum and carry output terminals, a sum branch coupled between said input circuit and the sum output terminal, a carry branch coupled between said input circuit and the carry output terminal, each of said branches including a first and a second transistor whose outputs are inverted with respect to each other, said first transistor of each branch being coupled between said second transistor of the branch and said input circuit and its output being inverted with respect to the input of the branch, each of said transistors being connected in common emitter configuration and having respective base, collector and emitter electrodes, said first and second transistors in each branch being of opposite conductivity types, said sum branch being responsive to an eletcrical quantity at the base electrode of its first transistor proportional to the quantity of representing a binary 1 at any one of said input terminals to produce a binary 1 at the sum output terminal, said carry branch being responsive to an electrical quantity at the base electrode of its first transistor proportional to the sum of the quantities representing binary 1's on both input terminals to produce a binary 1 at the carry output terminal, means for preventing the production of a 1 at the sum output terminal when the base electrode of said first sum transistor is subjected to an electrical quantity proportional to the sum of electrical quantities representing binary 1's at both input terminals, said means including a bias circuit connected from the collector electrode of said second carry transistor to the emitter electrode of said first sum transistor for modifying the response threshold of said first sum transistor in response to said second carry amplifier.

10. The combination of claim 9 wherein there is a resistor in series with the collector electrode of said second carry transistor, and said bias circuit includes a voltage divider connected across said resistor, the voltage divider having an intermediate tap connected to the emitter electrode of said first sum transistor.

11. A binary adder comprising an input circuit including respective first and second input terminals connected to a common junction, respective sum and carry output terminals, a sum branch coupled between said junction and the sum output terminal, a carry branch coupled between said junction and the carry output terminal, each of said branches including a first and a second transistor whose outputs are inverted with respect to each other, said first transistor of each branch being coupled between said second transistor of the branch and said junction and its output being inverted with respect to the input of the branch, each of said transistors being connected in common emitter configuration and having respective base, collector and emitter electrodes, said first and second transistors in each branch being of opposite conductivity types, said sum branch being responsive to an electrical quantity at the base electrode of its first transistor proportional to the quantity representing a binary 1 at any one of said input terminals to produce a binary 1 at the sum output terminal, said carry branch being responsive to an electrical quantity at the base electrode of its first transistor proportional to the sum of the quantities representing binary 1's on both said input terminals to produce a binary 1 at the carry output terminal, means for preventing the production of a 1 at the sum output terminal when the base electrode of said first sum transistor is subjected to an electrical quantity proportional to the sum of electrical quantities representing binary 1's at both said input terminals, said means including a bias circuit connected from the collector electrode of said second carry transistor to the emitter electrode of said first sum transistor for modifying the response threshold of said first sum transistor in response to said second carry transistor.

12. The combination of claim 11 wherein there is a resistor in series with the collector electrode of said second carry transistor, and said bias circuit includes a voltage divider connected across said resistor, the voltage divider having an intermediate tap connected to the emitter electrode of said first sum transistor.

13. A binary adder comprising an input circuit including respective first, second and third input terminals connected to a common junction, respective sum and carry output terminals, a sum branch coupled between said junction and the sum output terminal, a carry branch coupled between said junction and the carry output terminal, each of said branches including a first and a second transistor whose outputs are inverted with respect to each other, said first transistor of each branch being coupled between said second transistor of the branch and said junction and its output being inverted with respect to the input of the branch, each of said transistors being connected in common emitter configuration and having respective base, collector and emitter electrodes, said first and second transistors in each branch being of opposite conductivity types, said sum branch being responsive to an electrical quantity at the base electrode of its first transistor proportional to the quantity representing a binary 1 at any one of said input terminals to produce a binary 1 at the sum output terminal, said carry branch being responsive to an electrical quantity at the base electrode of its first transistor proportional to the sum of the quantities representing binary 1's on at least any two of said input terminals to produce a binary 1 at the carry output terminal, inhibit means for preventing the production of a 1 at the sum output terminal when the base electrode of said first sum transistor is subjected to an electrical quantity proportional to the sum of electrical quantities representing binary 1's at any two of said input terminals, said means including a bias circuit connected from the collector electrode of said second carry transistor to the emitter electrode of said first sum transistor for modifying the response threshold of said first sum transistor in response to said second carry amplifier, said sum branch being responsive to an electrical quantity at the base electrode of its first transistor proportional to the sum of the electrical quantities representing binary 1's at all of said input terminals to overcome the inhibition of said inhibit means thereby to produce a 1 at the sum output terminal.

14. The combination of claim 13 wherein there is a resistor in series with the collector electrode of said second carry transistor, and said bias circuit includes a voltage divider connected across said resistor, the voltage divider having an intermediate tap connected to the emitter electrode of said first sum transistor.

References Cited in the file of this patent

UNITED STATES PATENTS

| | | |
|---|---|---|
| 2,673,293 | Eckert | Mar. 23, 1954 |
| 2,765,115 | Beloungie | Oct. 2, 1956 |
| 2,815,913 | Lucas | Dec. 10, 1957 |
| 2,892,099 | Gray | June 23, 1959 |
| 2,901,638 | Chang | Aug. 25, 1959 |

FOREIGN PATENTS

| | | |
|---|---|---|
| 736,760 | Great Britain | Sept. 14, 1955 |